United States Patent [19]

Futami et al.

[11] Patent Number: 4,926,417
[45] Date of Patent: May 15, 1990

[54] INFORMATION TRANSMISSION AND RECEPTION SYSTEM FOR A VEHICLE

[75] Inventors: Toru Futami; Tadashi Suzuki; Atsushi Sakagami, all of Kanagawa, Japan

[73] Assignee: Nissan Motor Company, Ltd., Japan

[21] Appl. No.: 351,299

[22] Filed: May 11, 1989

Related U.S. Application Data

[63] Continuation of Ser. No. 896,337, Aug. 13, 1986, abandoned.

[30] Foreign Application Priority Data

Sep. 4, 1985 [JP] Japan .................. 60-193915

[51] Int. Cl.⁵ .............................................. H04J 3/02
[52] U.S. Cl. .................... 370/85.1; 340/825.5; 307/10.1
[58] Field of Search ............... 370/58, 86, 100, 85, 370/85.1, 85.7, 85.5, 85.15, 58.1, 100.1; 340/825.5, 825.05; 307/10.1, 10.8

[56] References Cited

U.S. PATENT DOCUMENTS

| | | | |
|---|---|---|---|
| 3,757,050 | 9/1973 | Mizote | 370/18 |
| 4,156,112 | 5/1979 | Moreland | 370/85.11 |
| 4,484,190 | 11/1984 | Bedard | 340/825.06 |
| 4,606,822 | 8/1986 | Suzuki et al. | 370/85 |
| 4,674,084 | 6/1987 | Suzuki et al. | 370/85 |
| 4,739,183 | 4/1988 | Tokura et al. | 307/10 R |

FOREIGN PATENT DOCUMENTS

| | | |
|---|---|---|
| 0128406 | 5/1984 | European Pat. Off. |
| 2412959 | 3/1974 | Fed. Rep. of Germany |
| 50-27932 | 3/1975 | Japan |
| 57-208746 | 12/1982 | Japan |
| 79/00351 | 6/1979 | PCT Int'l Appl. |
| 1096403 | 12/1967 | United Kingdom |
| 1287334 | 8/1972 | United Kingdom |
| 1298190 | 11/1972 | United Kingdom |
| 1427133 | 3/1976 | United Kingdom |
| 1462052 | 1/1977 | United Kingdom |
| 1494240 | 12/1977 | United Kingdom |
| 2041592 | 9/1980 | United Kingdom |

OTHER PUBLICATIONS

Ein byteserielles bitparalleles Schnittstellensystem fur programmierbare mebgerate—DIN IEC 625 Teil 1 Mai 1981, Wie funktioniert der IEC Bus?—Elektronik 1975; Klaus, pp. 72–78.
Microprocessor Interfacing Techniques—Zaks et al.; Syndex Inc.; 1979; pp. 93–109.

Primary Examiner—Joseph A. Orsino
Assistant Examiner—Frank M. Scutch, III
Attorney, Agent, or Firm—Lowe, Price, LeBlanc, Becker & Shur

[57] ABSTRACT

An information transmitting and reception system applicable to a vehicle. The system comprises: (a) a plurality of information elements, some of which generating information for use by the remainder thereof, grouped into information sources and information receivers, the number of the information elements in the information sources and in the information receivers being limited to no more than a given number, (b) a plurality of information transmission units, each connected electrically to corresponding one of the information sources, (c) a plurality of information reception units, each connected electrically to corresponding one of the information receivers, and (d) means for connecting electrically each of the information transmission units to at least a corresponding one of the information reception units.

13 Claims, 9 Drawing Sheets

FIG.2 *(PRIOR ART)*

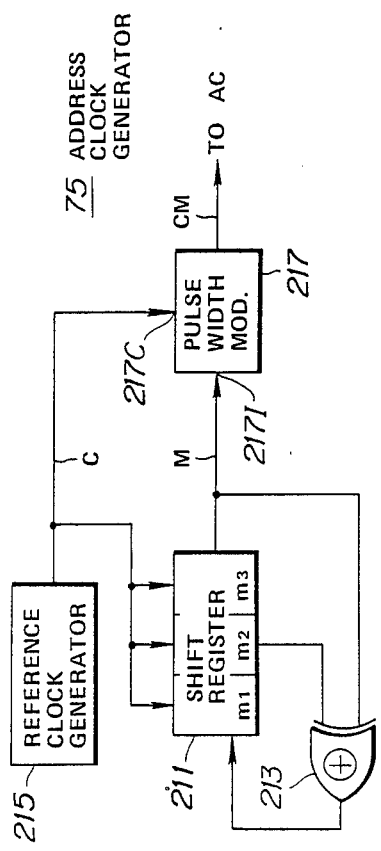
FIG.7
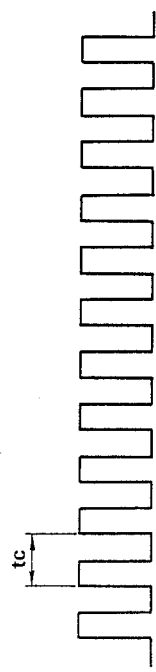
FIG.8 (a) REFERENCE CLOCK GENERATOR C
FIG.8 (b) M SERIES CODE SIGNAL M
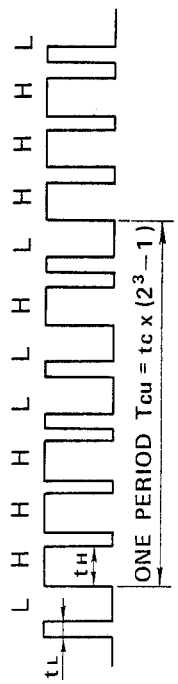
FIG.8 (c) M SERIES CODE SYNCHRONIZATION SIGNAL CM

INFORMATION TRANSMISSION AND RECEPTION SYSTEM FOR A VEHICLE

This application is a continuation of application Ser. No. 06/896,337, filed Aug. 13, 1986 now abandoned.

BACKGROUND OF THE INVENTION

1. Field of the Invention

The present invention relates to an information transmission and reception system for a vehicle which supplies information from any vehicular information source, such as switches, sensors and so on, to a vehicle information receiver which makes use of that information from the information source such as warning indicators, and normal loads such as headlights, etc.

2. Description of the Prior Art

In conventional transmission and reception systems applied to vehicles, electrical connections between vehicle information sources, such as switches and sensors, and vehicle information handling parts, such as loads and indicators, have always been in a one-to-one relationship with wire harness.

FIG. 1 shows a conventional transmission and reception system applied to the vehicle as described above.

As shown in FIG. 1, the vehicle is divided into an engine compartment denoted by <ENG.>, a dashboard central section denoted by <DASH>, an instrument panel denoted by <INST>, and a trunk denoted by <TRUNK>.

The engine compartment <ENG.> has a power supply (battery) 1, a right-hand front lamp group 3, a left-hand front lamp group 5, an automatic transmission (hereinafter, referred to as A/T) position detection switch group 7, and an A/T shift switch group 9.

The above-mentioned front lamp groups 3, 5 each include a head lamp main a, a head lamp dimmer b, a clearance lamp c, a front turn signal (side marker lamp) d, and a side turn signal e.

The above-mentioned A/T position detection switch group 7 includes five detection switches each for detecting a shift position from among first (1-range), second (2-range), drive (D-range), neutral (N-range), reversal (R-range), and parking (P-range).

The above-mentioned A/T shift switch group 9 comprises three shift change switches covering 1 range - 2 range (1-2), 2 range - 3 range (2-3), 3 range - 4 range (3-4) and an oil temperature monitor switch (oil).

The dashboard section <DASH> includes a circuit breaker 11, a front lamp switch group 13, and a peripheral switch group 15.

The front lamp switch group 13 is provided with five operation switches denoted by the same symbols a, b, c, d, and e used for the lamp groups 3 and 5. That is to say, symbol a in the group 13 denotes a switch for the lamp main, symbol b in the group 13 denotes a switch for the dimmer, symbol c in the group 13 denotes a switch for the clearance lamp, symbol d in the group 13 denotes a switch for the front turn signal lamp, and symbol e in the group 13 denotes a switch for the side turn signal lamp.

The peripheral switch group 15 includes all switches and sensors not included in the engine or in the trunk, specifically, a parking brake switch Pa, an exhaust gas temperature sensor E, and a door switch Do.

The instrument panel <INST> includes an A/T position indicator 17, a warning lamp group 19, and a rear actuator switch group 21.

The above-mentioned A/T position indicator 17 is provided with six indicators displaying the shift gear positions 1, 2, D, N, R, and P corresponding to the above-described A/T position detection switch group 7.

The above-mentioned warning lamps 19 include a parking brake warning lamp Pa, an exhaust temperature warning lamp E, and a warning lamp Do indicating that a door is incompletely closed.

The above-described rear part actuator switch group 21 comprises a trunk lid opener solenoid switch T, fuel lid opener solenoid switch F, rear defogger resistor switch R, and power antenna motor switch A.

The trunk actuator group 23 comprises a trunk lid opener solenoid 23T, a fuel lid opener solenoid 23F, a rear defogger resistor 23R, and a power antenna motor 23A. In addition, an A/T (automatic transmission) control unit 25 is disposed in the trunk. A wire harness 27 extending the length of the vehicle interconnects these lamps, indicators, actuators, and so on.

It should be noted that various additional electrical appliances will be installed in the vehicle and serve either as information supply elements or information receiving elements. In the example given above of connections between conventional vehicle information supply elements and information receiving elements, the wire harness 27 is used to connect the various switches, sensors, etc with the corresponding indicators and actuators, as well as to the power supply 1 and short-circuit protector (circuit breaker) 11.

There is a problem in that the transmission and reception system which uses the wire harness as shown in FIG. 1 requires a relatively large harness under the recent circumstances in which the number of automotive electrical appliances is constantly increasing. As the diameter of each wire harness increases, the branching between harnesses becomes more complex so that overall manufacture and wiring also becomes more complex.

There is another problem in that since in the transmission and reception system using a wire harness as shown in FIG. 1, the signal transmission lines and high-voltage supply lines inevitably interfere, which reduces the reliability of signal transmission and reception despite noise-free countermeasures.

On the other hand, a multiplex transmission reception systems which solve the problems of the transmission and reception system described above have been proposed, for example, in Japanese Patent Application Unexamined Open No. Sho 50-27932 and Japanese Patent Application Unexamined Open No. Sho 57-208746.

FIG. 2 shows the basic structure of the multiplex transmission and reception system mentioned above applied to the vehicle.

In the conventional multiplex transmission and reception system shown in FIG. 2, the vehicle is divided into four regions, i.e., engine compartment, dashboard central section, instrument panel, and trunk, each position being provided with a dedicated multiplex transmission and reception unit 29, 31, 33, and 35 connected via a bus network 37 as shown in FIG. 2.

The network 37 may be of a loop type (refer to the Japanese Patent Application Unexamined Open No. 57-208746) in place of a bus type, or alternatively of a star type. In addition, normal vehicular wiring may be used for the trunk line 37 or alternatively a shielded cable or optical fiber may be used.

Each multiplex transmission and reception unit shown in FIG. 2 comprises a unit capable of transmitting and receiving related signals. Further a processing of signal transmission and reception is carried out in each multiplex transmission and reception system.

For example, suppose that lamp main switch a in the front lamp switch group 13 is turned on so that the turn-on signal is outputted to the transmission and reception unit 31 for the dashboard <DASH> via the line $\lambda_1$. Then, the multiplex transmission and reception unit 31 reads the signal-level state on the line $\lambda_1$ and sends same to a predetermined address corresponding to lamp main switch 13a, and sends a signal ordering both lamp mains a in the left and right main lamp groups 3, 5 to be turned on at a predetermined timing to another multiplex transmission and reception unit 29. The addressing and data transmission timing are carried out on the basis of an address clock signal in the form of an M-series time series code. As appreciated from FIG. 2, the transmission and reception units communicate between the addressed transmission memory and the addressed reception memory via a single line 37 and therefore the overall processing is complex.

The conventional multiplex transmission and reception system described above with reference to FIG. 2 has the following problems:

(1) Each multiplex transmission and reception unit must transmit and receive the data to and from each of the other positions and must carry out communications with all of the other multiplex transmission and reception units. Therefore, a high-level protocol and correspondingly complex structure are necessary.

(2) Each multiplex transmission and reception unit employs a high-level protocol. Therefore, if one of the multiplex transmission and reception units should fail, the symptoms of failure would appear at every unit, whereby failure diagnosis and trouble shooting would be difficult.

(3) The whole system must be connected by way of a high-level protocol. Therefore, as each multiplex transmission and reception unit is highly integrated, modification and alternation thereof are rather difficult, and thus the system lacks general-purpose utility.

(4) Each multiplex transmission and reception unit must be relatively large if a single standardized unit is to be mass-produced to provide general-purpose utility, in order to satisfy the needs of the largest station in the information transmission and reception system. Therefore, the cost of the whole system is increased.

SUMMARY OF THE INVENTION

With these various problems in mind, it is an object of the present invention to provide a transmission and reception system for a vehicle with a simple structure and with no need for a high-level protocol, which is easy to operate, and which is flexible and of general-purposed utility.

The above-described object can be achieved by providing: an information transmission and reception system, comprising: (a) a plurality of information elements, some of which generating information for use by the remainder thereof, grouped into information sources and information receivers, the number of the information elements in the information sources and in the information receivers being limited to no more than a given number, (b) a plurality of information transmission units, each connected electrically to corresponding one of the information sources, (c) a plurality of information reception units, each connected electrically to corresponding one of the information receivers, and (d) means for connecting electrically each of the information transmission units to at least a corresponding one of the information reception units.

BRIEF DESCRIPTION OF THE DRAWINGS

A more complete understanding of the present invention may be obtained from the following detailed description taken in conjunction with the attached drawings in which:

FIG. 7 is a simplified block diagram of an address clock generator shown in FIG. 6;

FIG. 8a-8c are signal waveform charts for the address clock generator shown in FIG. 7;

DETAILED DESCRIPTION OF THE PREFERRED EMBODIMENTS

Reference will hereinafter be made to the drawings in order to facilitate understanding of the present invention.

(General Description)

Figure 1:
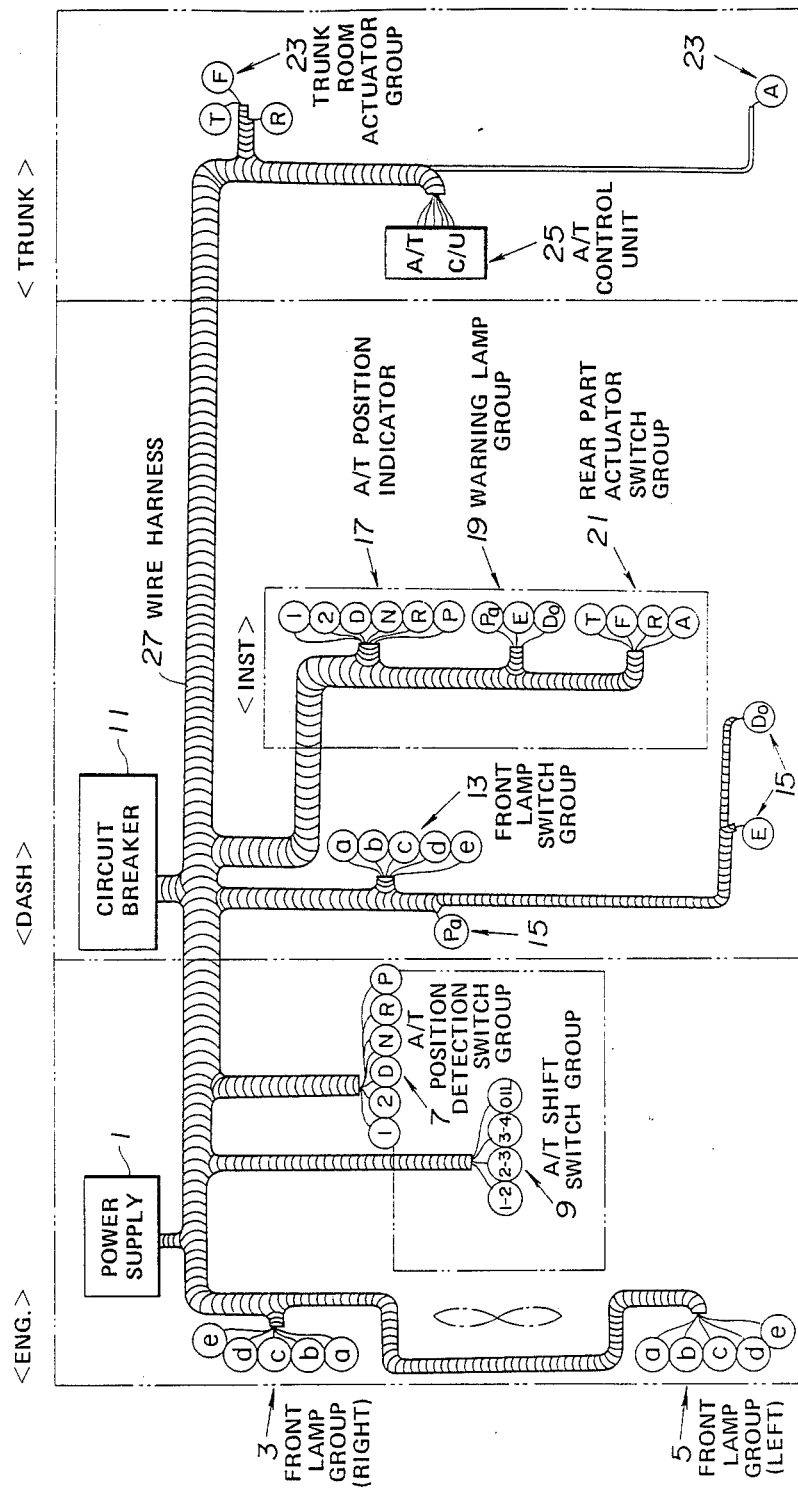
FIG. 1 is a simplified wiring diagram of a conventional transmission and reception system for a vehicle using a wire harness.
Figure 2:
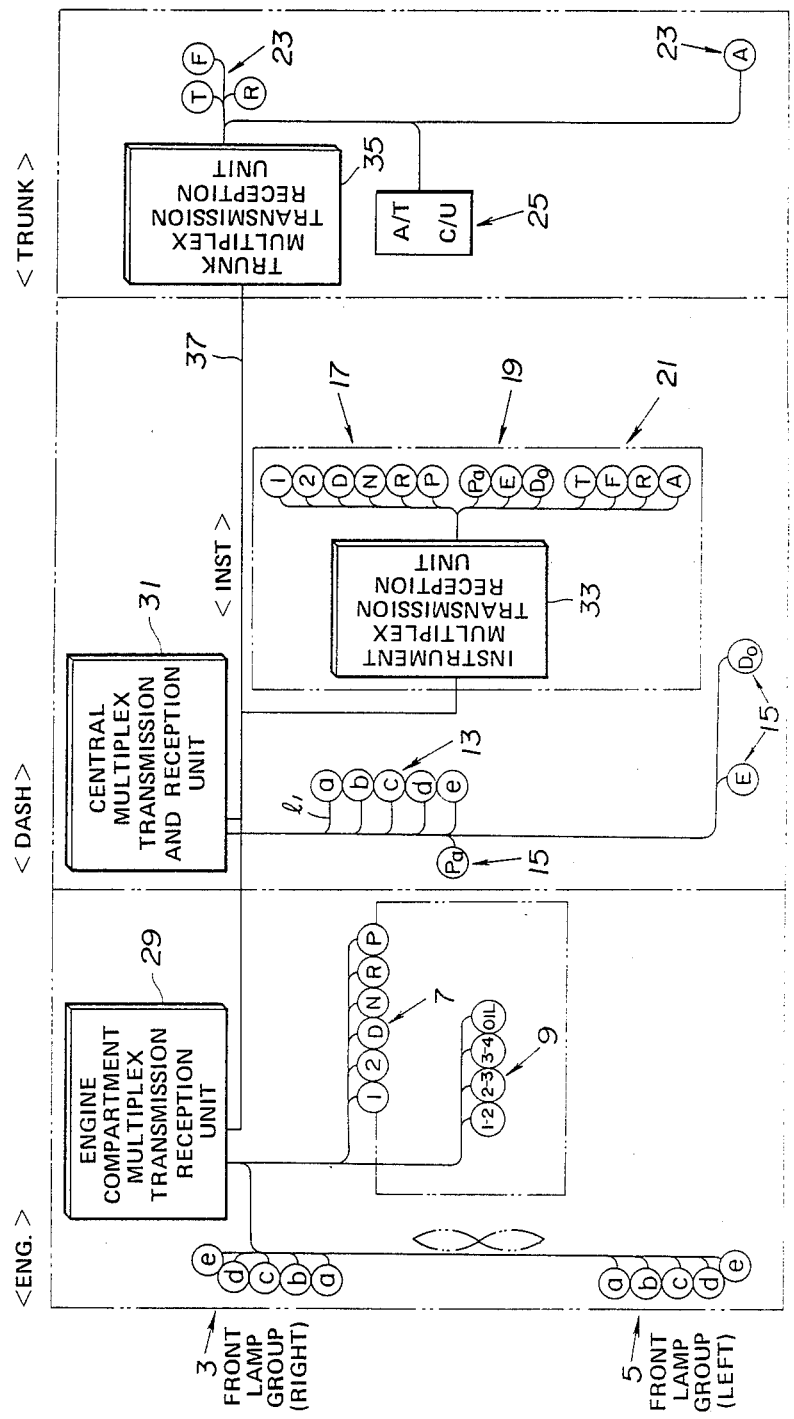
FIG. 2 is a simplified block diagram of another conventional multiplex-type transmission and reception system for a vehicle.

The elements shown in FIGS. 1 and 2 can be thought of as an information field made up of information sources and information receivers grouped locally into the information field units <ENG.>, <DASH>, <INST> and <TRUNK>. The terms "information source" and "information receiver" refer to the coordinated collections of elements that are labelled with numerals in FIGS. 1 and 2 (with the exception of the front lamp groups 3 and 5, which make up a single information receiver).

The information units have a known limited number of unidirectional connections for information flow. In the case illustrated in FIGS. 1 and 2, five such unidirectional connections are necessary, as reflected in the five groups G1–G5 shown in Table 1.

the trunk <TRUNK>. The transmission side is provided with a transmission unit TG5 and reception side

TABLE 1

| | (GROUP DIVISION OF TRANSMISSION/RECEPTION UNITS) | | | | | | | | | |
|---|---|---|---|---|---|---|---|---|---|---|
| | ENG. | | | DASH | | INST | | | TRUNK | |
| | TRANS./RECEP. UNIT | | | | | | | | | |
| GROUP | RG1 | TG3 | TG5 | TG1 | TG2 | RG2 | RG3 | TG4 | RG4 | RG5 |
| G1 | FRONT LAMP GROUP (3,5) | | | FRONT LAMP SWITCH GROUP (13) | | | | | | |
| G2 | | | | | DASH PERIPHERY SWITCH GROUP (15) | WARNING LAMP GROUP (19) | | | | |
| G3 | | A/T POSITION DETECTION SWITCH GROUP (7) | | | | | A/T POSITION INDICATOR (17) | | | |
| G4 | | | | | | | | REAR ACTUATOR SWITCH GROUP (21) | TRUNK ACTUATOR GROUP (23) | |
| G5 | | | A/T SHIFT SWITCH GROUP (9) | | | | | | | A/T CONTROL UNIT (25) |

(First Preferred Embodiment)

Figure 3:
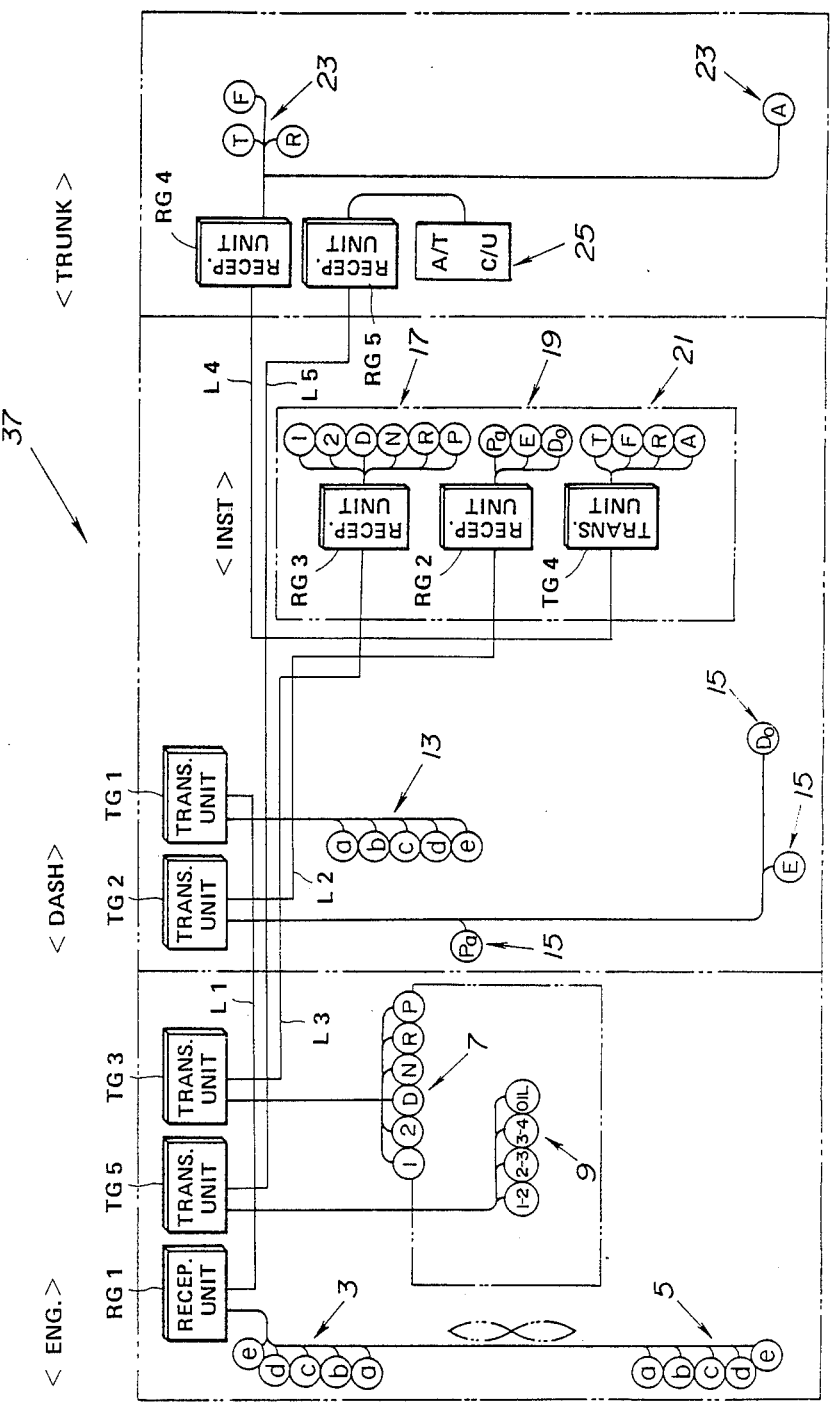
FIG. 3 is a simplified block diagram of a first preferred embodiment of a transmission and reception system for a vehicle according to the present invention.

FIG. 3 shows a system configuration of the first preferred embodiment of a multiplex time-division data transmission system for a vehicle according to the present invention.

The group 1 (G1) comprises a transmission side in the dashboard unit <DASH> and a reception side in the engine compartment <ENG.>. The transmission side is provided with a transmission unit TG1. The reception side is provided with a reception unit RG1.

The group 2 (G2) comprises a transmission side in the dashboard unit <DASH> and a reception side on the instrument panel <INST>. The transmission side is provided with a transmission unit TG2 and reception side with a reception unit RG2.

The group 3 (G3) comprises a transmission side in the engine compartment <ENG.> and a reception side on the instrument panel <INST>. The transmission side is provided with a transmission unit TG3 and the reception side is provided with a reception unit RG3.

The group 4 (G4) comprises a transmission side on the instrument panel and a reception side in the trunk <TRUNK>. The transmission side is provided with a transmission unit TG4 and reception side with a reception unit RG4.

The group 5 (G5) comprises a transmission side in the engine compartment <ENG.> and a reception side in the trunk <TRUNK>. The transmission side is provided with a transmission unit TG5 and reception side with a reception unit RG5.

A multiplex time-division data transmission system 37 is made up of five communication circuits, each having a serial signal transmission line L1, L2, L3, L4, and L5 connected between single, corresponding transmission and reception units.

Figure 4:
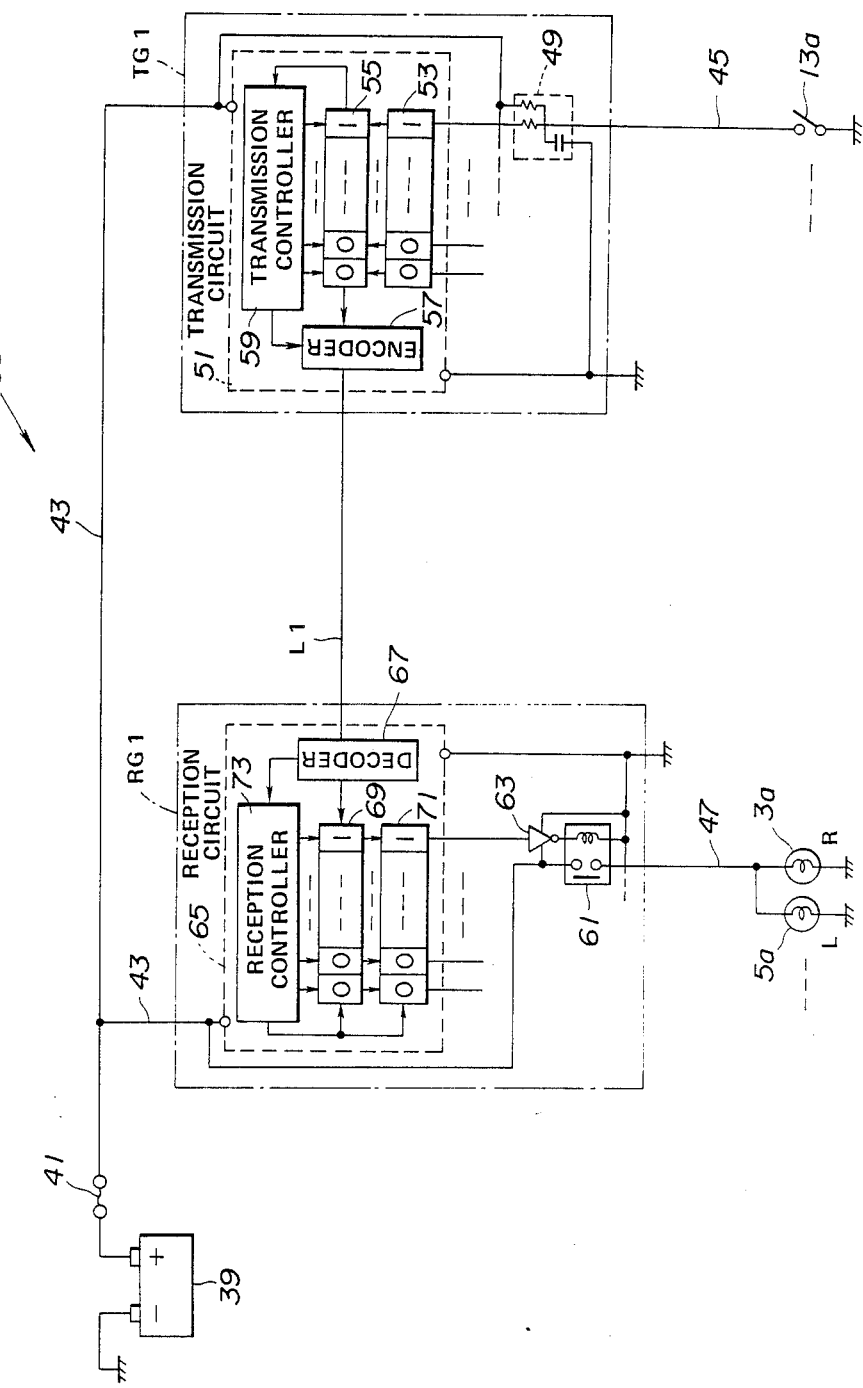
FIG. 4 is a simplified block diagram of the circuitry of each transmission unit and reception unit of the transmission and reception system in the first preferred embodiment shown in FIG. 3.

FIG. 4 shows the internal circuitry of the transmission and reception units of the first group G1 shown in FIG. 3, which is representative of all of the five communication circuits.

The communication circuit 38 of the first group 1 comprises the transmission unit TG1, the reception unit RG1, and a serial signal transmission line L1 connecting these units TG1 and RG1.

The transmission and reception units TG1 and RG1 receive power from a vehicle battery 39 via a fuse 41 and power supply lines 43. The transmission unit TG1 is connected to the switches of the front lamp switch group 13 via cables 45. On the other hand, the reception unit RG1 is connected to the right front lamp group 3 and to the left front group 5 via cables 47. It should be noted that in FIG. 4 only one cable 45, only the main switch 13a of the front lamp switch group 13 and only the main lamps 3a, 5a of the right and left front lamp groups 3 and 5 are shown to simplify the drawing.

The transmission unit TG1 includes a number of input protection circuits 49 and a transmission circuit 51. The transmission circuit 51 includes an input data buffer 53, an output shift register 55, an encoder 57, and a transmission controller 59.

The input protection circuits 49 are connected between each cable 45 and a corresponding, dedicated bit cell of the input data buffer 53 and retransmits the on-and-off signal of the corresponding switch as a binary signal at either a low level (ground potential) or high level (power supply voltage) to the above-described data buffer 53.

The input buffer 53 may comprise an 8-bit register which temporarily stores the present signal states of the switches 13a, 13b . . . .

The output shift register 55 inputs the contents of the input data buffer 53 in parallel at intervals of 50 milliseconds, shifts the input data "leftward" in FIG. 4 at intervals of one millisecond, and then outputs each bit to the encoder 57 sequentially starting at its leftmost bit position.

The encoder 57 modulates the data signal received from the output shift register 55 and outputs a modulated signal on the serial signal transmission line L1.

The reception unit RG1 comprises a number of relays 61, each illuminating one of the lamps in each lamp of the lamp groups 3, 5 with the power supply voltage supplied via a corresponding one of the power supply cables 47, an equal number of relay drivers 63, each of which drives one relay 61 and a reception circuit 65. The reception circuit 65 comprises a decoder 67, an input shift register 69, an output data buffer 71, and a reception controller 73.

The decoder 67 demodulates a data signal inputted via the above-described serial signal transmission line L1 and outputs the demodulated data signal to the input shift register 69.

The input shift register 69 receives the demodulated data from the decoder 67 one bit at a time, each bit causing a "leftward" shift.

The output data buffer 71 stores the data in the input shift register in parallel form.

The reception controller 73 is activated by the signal received by the above-described decoder 67, controls the timing of the shift operation of the input shift register 69, and outputs a timing signal for the fetched data to the input shift register 69 when it is outputted to the output data buffer 71.

The above-described output data buffer 71 holds the signal states at all times and is updated every 50 milliseconds, for example.

Given the circuitry shown in FIG. 4, if, e.g., the front lamp main switch 13a is turned on, the corresponding bit cell of the output data buffer 71 will receive that information via transmission circuit 51 and serial signal transmission line L1 so that the corresponding relay 61 will be actuated to illuminate both right and left front main lamps 3a, 5a.

It should be noted that although the number of bits of the input data buffer 53 and output shift register 55 are the same, that number may be 16 or 32 as well as 8. Similarly, the number of bits in the input shift register 69 and in the output data buffer 71 of the reception unit RG1 will match.

As described above, the multiplex time-division communication system 37 shown in FIG. 3 allows efficient data communication since the communication circuitry for each group operates independently.

(Second Preferred Embodiment)

Figure 5:
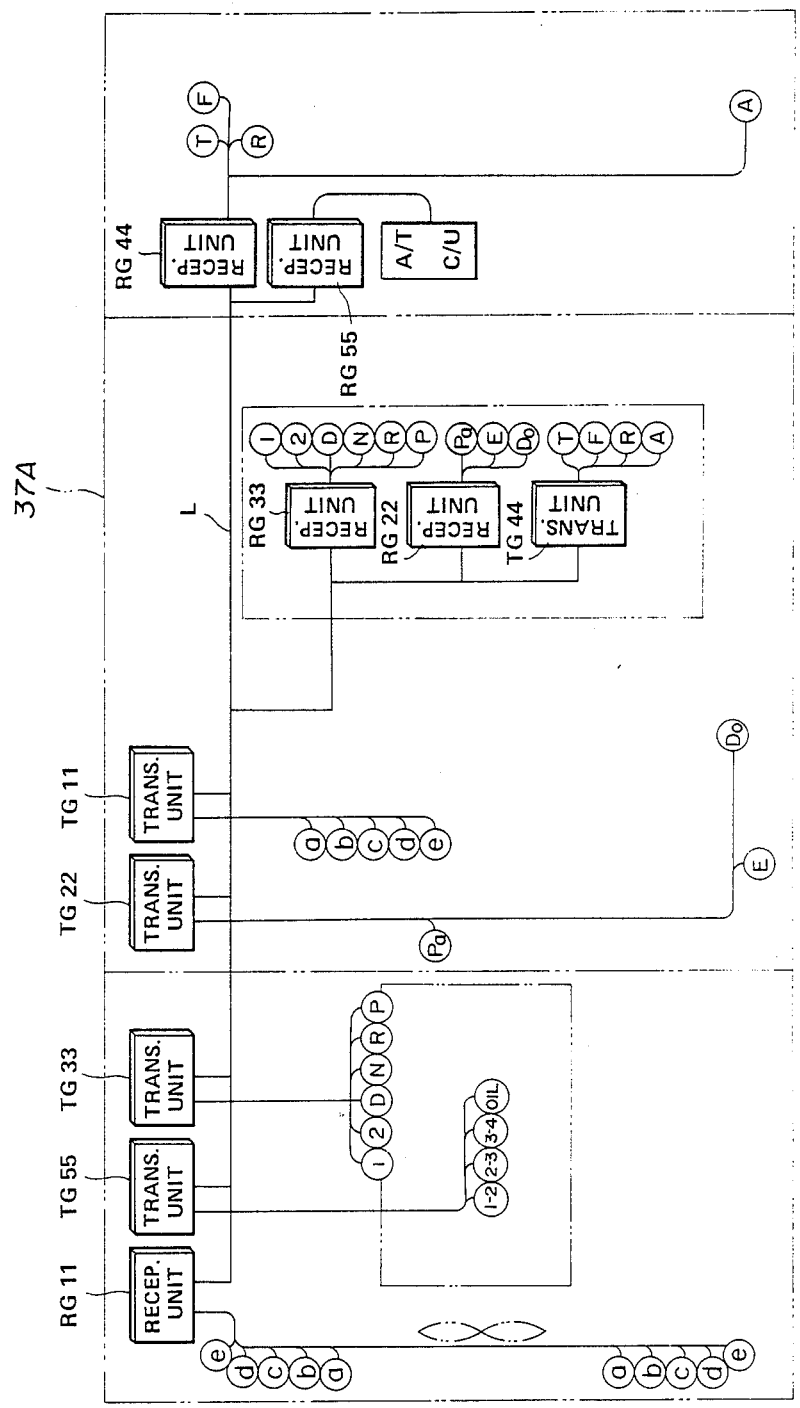
FIG. 5 is a simplified block diagram of a second preferred embodiment of the transmission and reception system according to the present invention.

FIG. 5 shows the system configuration of the multiplex time-division data transmission system in a second preferred embodiment according to the present invention.

The second preferred embodiment differs from the first embodiment in that a common line L (comprising a common data line Lo and address clock line AC) is installed in place of the independent serial signal transmission lines L1 through L5 and an address clock generator 75 is connected to the above-described address clock line, and that an address coincidence circuit 77, 79 is installed in each of the transmission and reception units TG11 through TG15 and RG11 through RG15.

Figure 6:
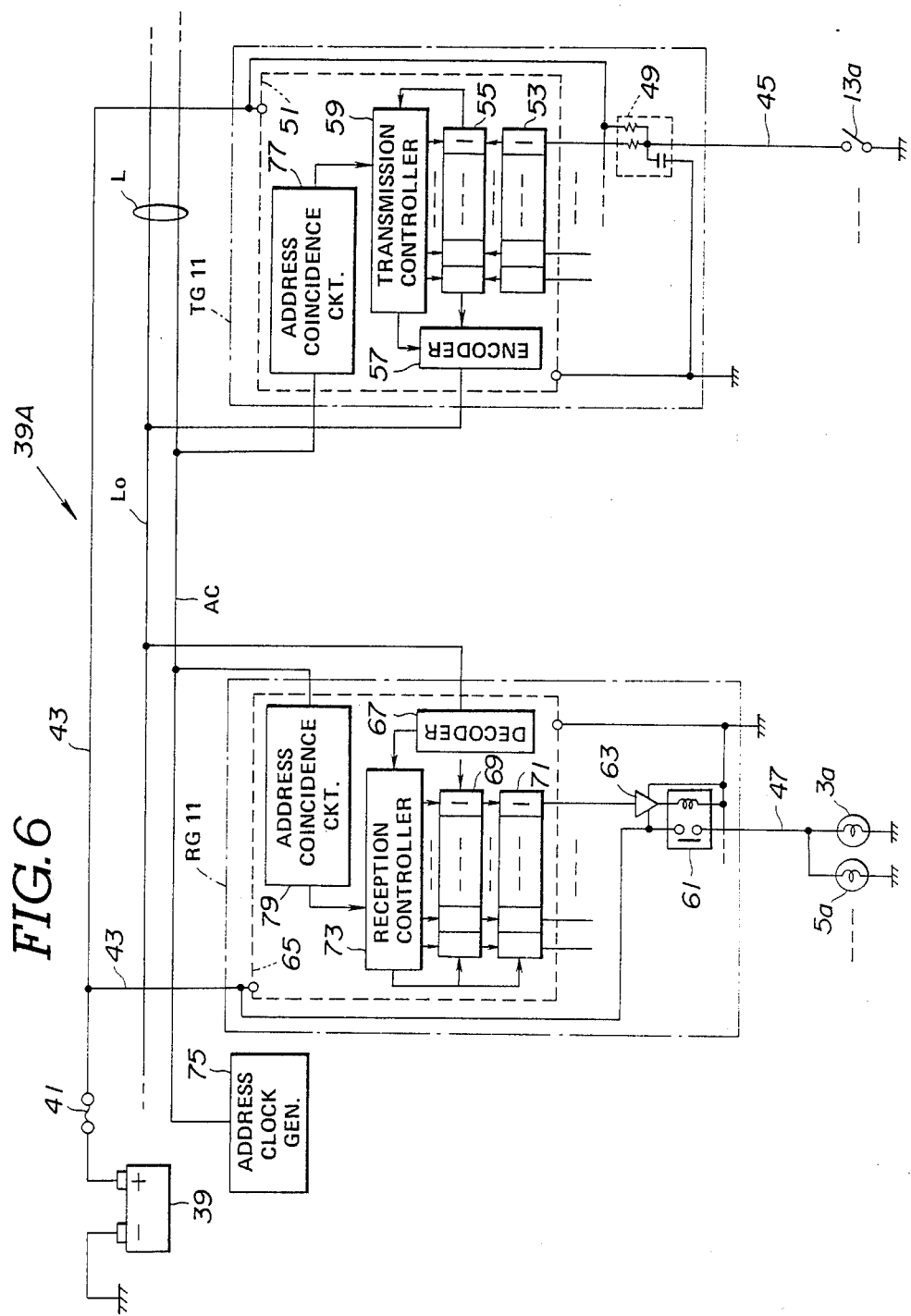
FIG. 6 is a simplified block diagram of the circuitry of each transmission and reception unit in the second preferred embodiment shown in FIG. 5.

As shown in FIG. 5, the transmission and reception units are all connected to the single common data line Lo. Although this connection is apparently similar to the conventional system shown in FIG. 1, the transmission and reception units connected to the data bus Lo perform only information transmission and reception, respectively, according to Table 1. In addition, in contrast to the system shown in FIG. 2, no addresses need be assigned to the separate elements of each information source and information receiver As shown in FIGS. 6, 7 and 8, the address clock generator 75 generates, e.g., a third-order M-series code signal and outputs this address clock signal on the address clock signal line AC.

The address coincidence circuits 77, 79 installed in each of the transmission and reception units TG11, RG11, . . . output an address coincidence signal when a three-bit address allocated to the corresponding unit and a three-bit numerical value read from the above-described address clock line AC (address clock signal) coincide.

If the same address is assigned to interconnected transmission and reception units TG11, TG12, . . . , TG15 and RG11, RG12, . . . , RG15 within each group, the transmission and reception circuits 51, 65 within each group will be activated together and without activating unrelated circuits.

Although five addresses are needed since the transmission and reception units are paired into five groups in the embodiment shown in FIG. 5, a third-order M-series address clock signal which can produce seven distinct addresses will be used to cover the addresses of the transmission and reception units. Third-order M-series address clock signals are discussed in U.S. patent application Ser. No. 780,935 filed on Sept. 6, 1985. The contents of the above-identified U.S. patent application are hereby incorporated by reference. In detail, a generator which generates the third-order M series address clock signal comprises, as shown in FIG. 7, a reference clock generator 215 which generates a reference clock signal C, as shown in (a) of FIG. 8, with a period tc, a three-bit shift register 211 whose clock terminal receives the reference clock signal c, an Exclusive OR gate 213, the output of which is connected to an input terminal of the first bit cell of the shift register 211 and the input terminals of which are connected to the outputs of the second and third bit cells of the shift register 211, and a pulse-width modulator 217 which receives the pulse-width modulated M-series code signal from the third bit cell of the shift register 211 and the reference clock signal c and produces an M-series code synchronous signal CM shown in (c) of FIG. 8, i.e., the third-order address clock signal described above. Each output waveform of the address clock signal generator 75 is shown in (a), (b), and (c) of FIG. 8.

In the transmission and reception system 37A in the second preferred embodiment, the common data line Lo is occupied on a time-share basis controlled by the address coincidence signals so that the information from any information source can efficiently be transmitted to the corresponding information receiver, just as in the first preferred embodiment.

(Other Preferred Embodiments)

Figure 9:
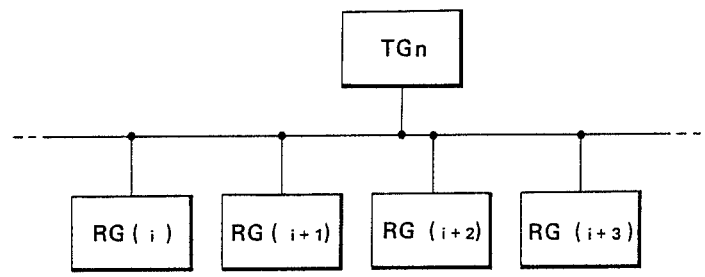
FIGS. 9 and 10 are diagrams of system configurations of other preferred embodiments according to the present invention.
Figure 10:
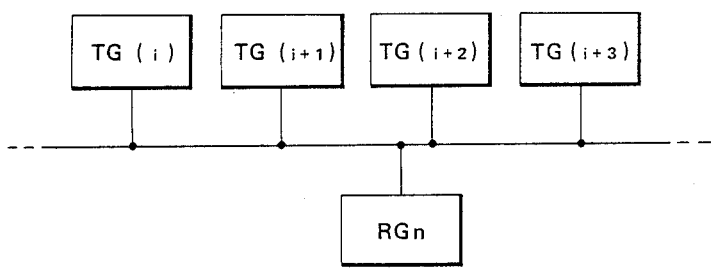

FIGS. 9 and 10 show system configurations in which groups consist of either multiple reception units (information reception part) or multiple transmission units (information source).

In the above-described first and second preferred embodiments, the information sources and information reception parts enjoy a one-to-one relationship. However, this relationship will not always be the case, as indicated by the front lamp groups 3, 5. As shown in FIGS. 9 and 10, there may be a single transmission unit TGn connected to four reception units, for example. Alternatively, a single reception unit RGn may be connected to four transmission units TGn.

In the embodiments shown in FIGS. 9 and 10, the registers in all transmission and reception units would have, e.g., eight-bit contents.

As a specific example of the system of FIG. 9, a single switch may be used to illuminate four lamps located at different places As a specific example of the system of FIG. 10, a single alarm lamp may be illuminated by the ANDed sum of alarm signals from four different places.

Figure 11:
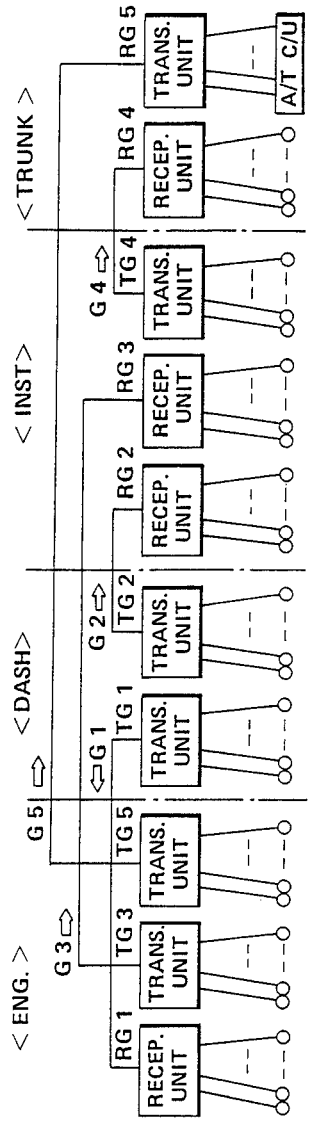
FIG. 11 is a diagram of the system configuration of a model of the transmission and reception system in the first preferred embodiment shown in FIGS. 3 and 4.
Figure 12:
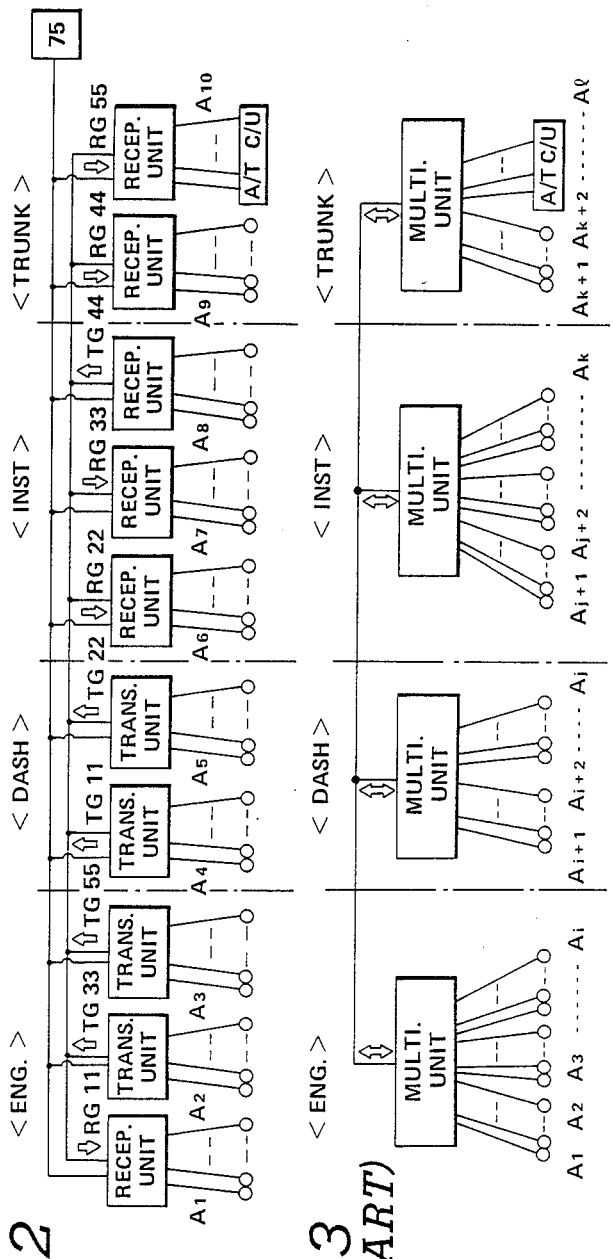
FIG. 12 is a diagram of the system configuration of a model of the transmission and reception system in the second preferred embodiment shown in FIGS. 5 through 8.
Figure 13:
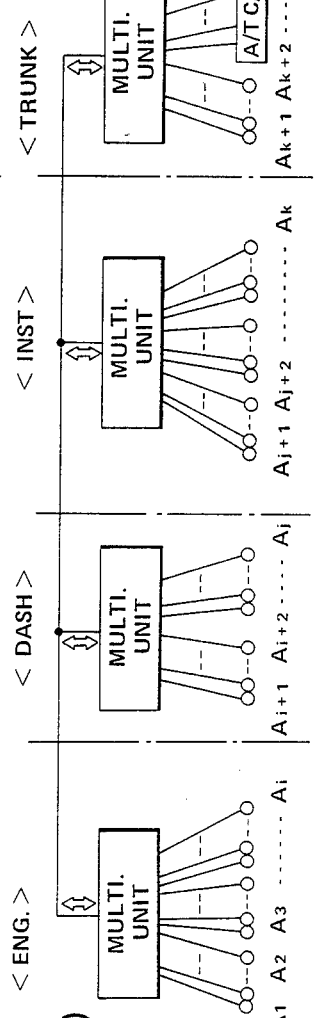
FIG. 13 is a diagram of the system configuration of a model of the conventional multiplex transmission and reception system shown in FIG. 2.

FIG. 11 is a diagram of the configuration of the transmission and reception system in the first preferred embodiment. FIG. 12 is a diagram of the configuration of the transmission and reception system in the second preferred embodiment. FIG. 13 is a diagram of the configuration of the conventional transmission and reception system shown in FIG. 2. It should be noted that the arrows in FIGS. 11-13 denote the direction of flow of information. In addition, A1, A2, A3, ... A10 denote addresses allocated to respective transmission and reception units and A1, A2, ..., Ai, ..., Aj, ..., Ak, ..., Al denote addresses allocated to the individual elements of the information sources and information receivers.

Comparison of these figures reveals that the inventive systems have a simpler and more flexible lay-out obviating the need for high-level protocols and all but the simplest addressing schemes.

It will clearly be understood by those skilled in the art that the foregoing description is made in terms of the preferred embodiments and various changes and modifications are made without departing from the scope of the present invention which is to be defined by the appended claims.

What is claimed is:

1. An information transmission and reception system, comprising:
   (a) a plurality of information elements including information generating elements and information using elements grouped into information sources and information receivers, respectively;
   (b) a plurality of information transmission units, each connected to a corresponding one of the information sources, each of said information transmission units including parallel-to-serial converting means for converting information in a parallel form from a corresponding information source into an electrical signal in a serial form;
   (c) a plurality of information reception units, each connected to a corresponding one of the information receivers, each information reception unit including serial-to-parallel converting means for converting an electrical signal in serial form from a corresponding information transmission unit into information in a parallel form, a maximum number of information elements in an information source and in an information receiver limited to a bit-capacity of each of said parallel-to-serial and serial-to-parallel converting means; and
   (d) means for connecting each of the information transmission units to a corresponding one of the information reception units, said connecting means including a plurality of electrical lines extended between respective ones of the information transmission units and the corresponding one of the information reception units for transmitting the information in a serial form from the information transmission unit to the corresponding information reception unit.

2. The system according to claim 1, wherein said connecting means comprises an electrical common line extended between the plurality of both information transmission and reception units for transmitting the information in a serial form from each of the information transmission units to the corresponding one of the information reception units in a time division mode.

3. An information transmission and reception system for a vehicle, comprising:
   (a) a plurality of vehicle component information elements on related vehicle components including information generating elements and information using elements grouped into information sources and information receivers, respectively, a predetermined maximum number of information elements being grouped into each of said information sources and each of said information receivers;
   (b) a plurality of information transmission units, each connected to a corresponding one of the information sources;
   (c) a plurality of information reception units, each connected to a corresponding one of the information receivers; and
   (d) means for connecting each of the information transmission units to a corresponding one of the information reception units, wherein each of the information transmission and reception units includes a shift register for converting the information in a bit parallel form from the corresponding information source into an electrical signal in a bit serial form to transmit the information from the information source when installed in each information transmission unit and for converting the information in the bit serial form from the corresponding transmission unit into the information in the bit parallel form to send it to the corresponding information receiver when installed in each information reception unit, so that the maximum number of information elements per group is equal to a bit capacity of said register.

4. The system according to claim 3, wherein said register has the bit capacity of eight bits.

5. A system for transmitting and receiving a vehicular information in a vehicle, comprising:

(a) a vehicular information movement space defined by a vehicle body and divided into an appropriate number of unit information movement spaces, each unit information movement space having at least one of an information supplying portion and an information receiving portion;

(b) at least one information transmitting unit connected to the information supplying portion for transmitting the information generated by the information supplying portion to the information receiving portion in any of the unit information movement spaces which requires the information from the information supplying portion; and (c) at least one information receiving unit for receiving and supplying the information transmitted by an associated information transmitting unit to the information receiving portion.

6. A system as set forth in claim 5, which further comprises:

(d) means for connecting the information transmitting unit and the information receiving unit so that the information can be moved from the information transmitting unit to the information receiving unit to which the information receiving portion requiring the information is connected.

7. A system as set forth in claim 5, which further comprises a plurality of said information transmitting units and a plurality of said information receiving units including (d) dedicated connecting means associated with each of said plurality of information transmitting units for individually connecting each said information transmitting units to each said information receiving units to which the information receiving portion requiring the information is connected.

8. A system as set forth in claim 6, wherein the connecting means comprises a signal transmission line connected between the information transmitting unit and information receiving unit requiring the information from the information transmitting unit.

9. A system as set forth in claim 8, wherein the information supplying portion comprises at least one information source and the information receiving portion comprises at least one information responsive device.

10. A system as set forth in claim 9, wherein the vehicular information movement space is divided into four unit information movement spaces comprising engine compartment space, dashboard space, instrument panel space, and trunk room space.

11. A system for transmitting and receiving a vehicular information in a vehicle, comprising:

(a) a vehicular information movement space defined by a vehicle body and divided into an appropriate number of unit information space having at least one of an information supplying portion and an information receiving portion;

(b) at least one information transmitting unit connected to the information supplying portion for transmitting the information generated by the information supplying portion to the information receiving portion in any of the unit information movement spaces which requires the information from the information supplying portion; and (c) at least one information receiving unit connected to the information receiving portion for receiving and supplying the information transmitted by the information transmitting unit to the information receiving portion and (d) means for connecting the information transmitting unit and the information receiving unit so that the information can be moved from the information transmitting unit to the information receiving unit to which the information receiving portion requiring the information is connected, the connecting means including: (a) a signal transmission line connected between all of the information transmitting and receiving units in the vehicular information movement space, and (b) means for generating a predetermined address clock signal and transmitting the predetermined address clock signal to all information transmitting and receiving units so that the information can be moved from the information transmitting unit to the address corresponding information receiving unit in a time division mode.

12. A system as set forth in claim 11, wherein the information supplying portion comprises a plurality of information sources and the information receiving portion comprises a plurality of information responsive devices, each device requiring the information on the corresponding information source and wherein the information transmitting unit includes parallel-to-serial converting means for converting inputted information on the information sources in a belt parallel form into a signal in a bit serial form and the information receiving unit includes serial-to-parallel converting means for converting the signal in the bit serial form received from the signal transmission line into the signal in the bit parallel form, so that the information responsive devices receive the information of the corresponding information sources, respectively.

13. A system as set forth in claim 12, wherein each of the parallel-to-serial converting means and serial-to-parallel converting means comprises a shift register.

* * * * *